3,666,464
DYE-SENSITIZED PHOTOSENSITIVE MATERIALS HAVING IMPROVED PHOTOGRAPHIC SPEED
Juergen H. H. Keller and Robert Hicks Sprague, Chelmsford, Mass., assignors to Itek Corporation, Lexington, Mass.
No Drawing. Filed Apr. 26, 1967, Ser. No. 633,689
Int. Cl. G03g 5/00; G03c 5/24, 1/00
U.S. Cl. 96—48                           24 Claims

ABSTRACT OF THE DISCLOSURE

Reproduction systems having improved photographic exposure speed are achieved wherein certain classes of cyanine and hemicyanine dyes are added to photosensitive photoconductor materials comprising titanium dioxide which, when activated, are capable of producing chemical reaction when in contact with image-forming material to produce a visible image. These classes of cyanine and hemicyanine dyes are described by the following generic structural formulas:

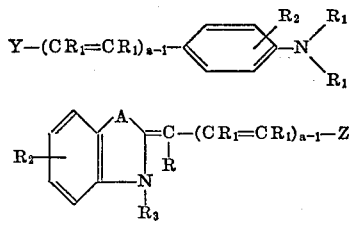

and wherein Y is selected from any of the group consisting of:

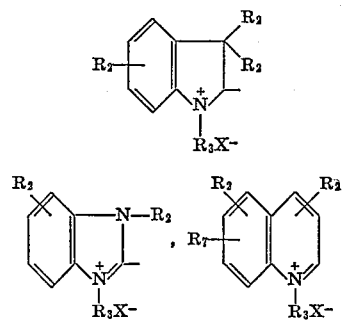

and

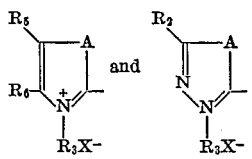

and Z is selected from any of the group consisting of:

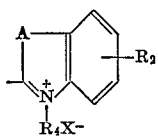

and

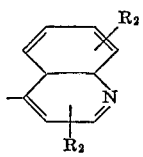

R may be an —H or a —C≡N group; $R_1$ may be hydrogen, alkyl, aralkyl, aryl, and alkaryl groups and wherein any $R_1$ on a given molecule may be the same or different as any other $R_1$ on this molecule; $R_2$ may be hydrogen, alkyl, aralkyl, aryl, alkaryl, alkoxy, and

wherein $R_1$ is as above described and wherein any $R_2$ on a given molecule may be the same or different as any other $R_2$ on this molecule; $R_3$ and $R_4$ may be hydrogen, an alkyl, aralkyl, or an alkanol group and may be the same or different, or $R_3$ and $R_4$ may form part of the same alkylene, aralkylene, alkalkylene, or hydroxy substituted alkylene group; $R_5$ and $R_6$ may be hydrogen, alkyl, aralkyl, aryl or alkaryl groups and wherein $R_5$ or $R_6$ may be the same or different than any other $R_5$ or $R_6$ group on the same molecule and wherein $R_5$ or $R_6$ may form part of the same ring structure when on adjacent carbon atoms and as such same ring structure may form cycloalkylene or aryl groups, or substituted cycloalkylene or aryl groups; $R_7$ is an —$OR_1$ or

group and at least one $R_7$ group must be present; X is a monovalent acid radical, and preferably a halide group such as fluoride, chloride, or iodide group; A is a sulphur (S) or a selenium (Se) group; and $a$ is a positive integer selected from the group consisting of 1, 2, 3, 4 and 5.

Improved processes using this improved photographic material comprise selectively exposing the above-described reproduction system to activating radiation. Image-forming material can be present on the substrate at the time of exposure to give a direct readout or only part of the image-forming material such as an oxidizing agent such as silver nitrate may be present on the substrate at the time of exposure, with the additional component of the image-forming material being added after exposure such as by contacting with a reducing agent such as Metol. On the other hand, it is possible to apply all of the image-forming material at a time subsequent to exposure to form a visible image. Titanium dioxide having a particle size less than about 250 millimicrons and which has been heated at a temperature between about 200° C. to about 950° C. is the preferred photosensitive material.

BACKGROUND OF THE INVENTION (1) Field of the invention

This invention relates to the field of photographic reproduction systems and, more specifically, to a photographic system utilizing an improved copy medium comprising a dye-sensitized photosensitive material which, when activated by suitable means, is capable of producing a visible image.

(2) Description of the prior art

Data or image storage media comprising radiation-sensitive materials such as titanium dioxide are described in detail in U.S. Pats. 3,152,903; 3,052,541; French Pats. 345,206 and 1,245,215 and in commonly-owned co-pending U.S. application Ser. No. 199,211, filed May 14, 1962 in the means of Elliot Berman et al. now abandoned. In the aforementioned U.S. patent application, radiation-sensitive titanium dioxide functions as a photosensitive component of the media and exposure of said media to activating means such as radiant energy, electron beams or the like results in the storage of a reversible latent image pattern therein. The reversible latent image pattern exists for a limited time during which said pattern can be converted to an irreversible form and read out visually by contacting said pattern with a suitable image-forming material, such as a chemical redox system. In the aforesaid U.S. and French patents, the radiation-sensitive material is combined with at least one component of an image-forming material prior to exposure to activating means. For example, U.S. Pat. 3,054,541 describes a photosensitive copy media comprising a photosensitive material such as titanium dioxide in combination with a reducible metal ion such as silver nitrate. This copy media is exposed to activating means to produce a visible image. On the other hand, U.S. Pat. 3,152,903 discloses a system wherein the photosensitive material is used in combination with both an oxidizing agent such as silver nitrate and a reducing agent such as hydroquinone. Upon exposure to suitable activating means, a visible image is formed. One of the limitations of the above-mentioned data or image storage systems is that they lack the photographic speed of systems such as silver halide. Therefore, in order to expand the possible uses of these photographic systems described in the above-mentioned patents and application, it is highly desirable to increase the photographic speed of these systems. Much research effort has been spent in trying to find ways of increasing the speed of these systems. However, up to the time of the present invention, these efforts have met with little or on success.

SUMMARY OF THE INVENTION

It has now been unexpectedly found that markedly increased photographic exposure speed is achieved when certain classes of cyanine and hemicyanine dyes are added to photographic data or image storage systems comprising a photosensitive material which when activated is capable of causing a chemical reaction to take place when contacted with suitable image-forming material. Therefore, the present invention comprises image reproduction systems comprising (1) a photosensitive material which, when activated, is capable of producing chemical reaction when in contact with image-forming material to produce a visible image, and (2) certain classes of cyanine and hemicyanine dyes as described by the following generic structural formulas:

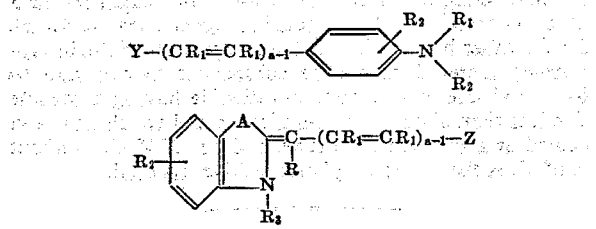

and wherein Y is selected from any of the group consisting of:

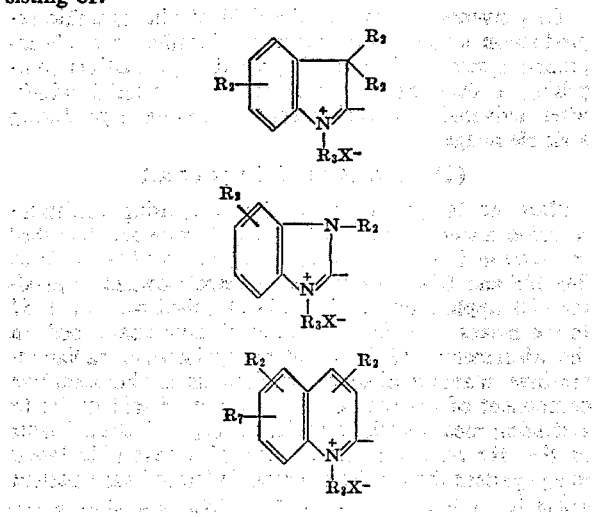

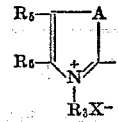

and

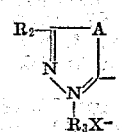

and Z is selected from any of the group consisting of:

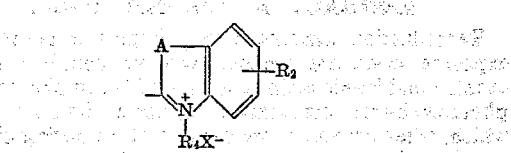

and

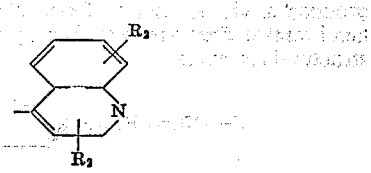

R may be an —H or a —C=N group; $R_1$ may be hydrogen, alkyl, aralkyl, aryl, and alkaryl groups and wherein any $R_1$ on a given molecule may be the same or different as any other $R_1$ on this molecule; $R_2$ may be hydrogen, alkyl, aralkyl, aryl, alkaryl, alkoxy, and

wherein $R_1$ is as above described and wherein any $R_2$ on a given molecule may be the same or different as any other $R_2$ on this molecule; $R_3$ and $R_4$ may be hydrogen, an alkyl, aralkyl, or an alkanol group and may be the same or different, or $R_3$ and $R_4$ may form part of the same alkylene, aralkylene, alkalkylene, or hydroxy substituted alkylene group; $R_5$ and $R_6$ may be hydrogen, alkyl, aralkyl, aryl or alkaryl groups and wherein $R_5$ or $R_6$ may be the same or different than any other $R_5$ or $R_6$ group on the same molecule and wherein $R_5$ or $R_6$ may form part of the same ring structure when on adjacent carbon atoms and as such same ring structure may form cycloalkylene or aryl groups, or substituted cycloalkylene or aryl groups; $R_7$ is an —$OR_1$ or

group and at least one $R_7$ group must be present; X is a monovalent acid radical, and preferably a halide group such as fluoride, chloride, or iodide group; A is a sulphur (S) or a selenium (Se) group; and $a$ is a positive integer selected from the group consisting of 1, 2, 3, 4 and 5.

It will be understood that the copy media of this invention may optionally include imaging material such as above described. Therefore, one of the preferred embodiments of this invention is wherein an oxidizing agent is present on the dyed photosensitive substrate of this invention at the time of exposure. Another preferred embodiment is wherein the dyed photosensitive substrate includes not only an oxidizing agent but additionally, a reducing agent at the time of exposure to suitable activating means.

DESCRIPTION OF PREFERRED EMBODIMENTS

The photoconductor or photocatalyst preferred in this invention are metal containing photoconductors. A preferred group of such photosensitive materials are in the inorganic materials such as compounds of a metal and a non-metallic element of Group VI–A of the Periodic Table [1] such as oxides, such as zinc oxide, titanium dioxide, zirconium dioxide, germanium dioxide, indium trioxide; metal sulfides such as cadmium sulfide (CdS), zinc sulfide (ZnS) and tin disulfide ($SnS_2$); metal selenides such as cadmium selenide (CdSe). Metal oxides are especially preferred photoconductors of this group. Titanium dioxide is a preferred metal oxide because of its unexpectedly good results. Titanium dioxide having an average particle size less than about 250 millimicrons and which has been treated in an oxidizing atmosphere at a temperature between about 200° C. and 950° C. for from about 0.5 hour to about 30 hours is especially preferred and, more especially, that titanium dioxide produced by high temperature pyrolysis of titanium halide.

Also useful in this invention as photoconductors are certain fluorescent materials. Such materials include, for example, compounds such as silver activated zinc sulfide, zinc activated zinc oxide, manganese activated zinc phosphate $Zn_3(PO_4)_2$, an admixture of copper sulfide, antimony sulfide (SbS) and magnesium oxide (MgO), and cadmium borate.

While the exact mechanism by which this invention works is not known, it is believed that exposure of photoconductors or photocatalysts of this invention to activating means causes an electron or electrons to be transferred from the valence band of the photoconductor or photocatalyst to the conductance band of the same or at least to some similar excited state whereby the electron is loosely held, thereby changing the photoconductor from an inactive form to an active form. If the active form of the photoconductor or photocatalyst is in the presence of an electron accepting compound a transfer of electrons will take place between the photographic and the electron accepting compound, thereby reducing the electron accepting compound. Therefore a simple test which may be used to determine whether or not materials have a photoconductor or photocatalytic effect is to mix the material in question with an aqueous solution of silver nitrate. Little, if any, reaction should take place in the absence of light. The mixture is then subjected to light. At the same time that a control sample of an aqueous solution of silver nitrate alone is subjected to light, such as ultraviolet light. If the mixture darkens faster than the silver nitrate alone, the material is a photoconductor or photocatalyst.

It is evident that the gap between the valence and the conducting band of a compound determines the energy needed to make electron transitions. The more energy needed, the higher the frequency to which the photoconductor will respond. It is known to the art that it is possible to reduce the band-gap for these compounds by adding a foreign compound as an activator which either by virtue of its atomic dimensions or by possessing a particular electronic forbidden zone structure or through the presence of traps or donor levels in the intermediate zone between the valence and the conduction band stresses the electronic configuration of the photoconductive compound, thereby reducing its band-gap and thus increasing its ability to release electrons to its condition band. Phosphors almost necessarily imply the presence of such activating substances. The effect of such impurities may be such as to confer photoconductivity upon a compound which intrinsically is non-photoconductive. The (Ca-Sr)S phosphors are believed to be an example of this group. On the other hand, excessive impurity content can interfere with a compound acting as a photoconductor, as above described. It is not known why the particular classes of cyanines or hemicyanine dyes of this invention increase the photographic speed.

The dyes of this invention may be used in solution to treat the photosensitive materials prior to their incorporation into a copy medium. These dyed photosensitive materials can then be deposited on a substrate, or incorporated into a substrate such as fibrous web or paper. Alternatively, the dye can be combined with the photoconductive materials in the copy medium, as per example, by dispersion of the dye in the binder for the photosensitive material. In addition, it is possible to dip dye the photosensitive substrate by merely immersing a substrate containing the photosensitive material into a solution of the particular dye. In coating a transparent film such as cellulose triacetate, particular problems arose when applying a dyed photoconductor in a gelatin binder to a transparent polyester film such as cellulose triacetate. This problem was overcome by first forming an aqueous slurry of the photosensitive material with gelatin dissolved therein and then incorporating a solution of the particular dye desired. This slurry is then applied to the film substrate to form a uniformly-dyed photosensitive substrate having the desired increased speed and other desirable properties of this invention.

Radiation sources useful in this invention are generally those emitting actinic light or at least parts of the actinic light range to which the particular dye sensitizes.

The inert carrier sheet upon which the photoconductor and cyanine or hemicyanine dyes of this invention are deposited comprises any suitable backing of sufficient strength and durability to satisfactorily serve as a reproduction carrier. The carrier sheet may be in any form such as, for example, sheets, ribbons, rolls, etc. This sheet may be made of any suitable materials such as wood, rag content paper, pulp paper, plastics such as, for example, polyethylene terephthalate (Mylar) and cellulose-acetate, cloth, metallic foil and glass. The preferred form of the carrier sheet is a thin sheet which is flexible and durable.

It is also useful to use a binder agent to bind the cyanine or hemicyanine dye of this invention and photosensitive materials to the carrier sheet. In general, these binders are translucent or transparent so as not to interfere with transmission of light therethrough. Preferred binder materials are organic materials such as resins. Examples of suitable resins are butadiene-styrene copolymer, poly-(alkyl acrylates) such as poly-(methyl methacrylate), polyamides, polyvinyl acetate, polyvinyl alcohol and polyvinylpyrrolidone.

The photoconductor should be conditioned in the dark before exposure. Such conditioning is generally conducted from one to twenty-four hours. After conditioning, the photoconducotor is not exposed to light prior to its exposure to activating radiation for recording an image pattern.

The period of exposure will depend upon the intensity of the light source, the particular imaging material, particular photoconductor, the type and amount of catalyst, if any, and like factors known to the art. In general, however, the exposure may vary from about .01 seconds to several minutes.

While this invention is concerned particularly with forming a negative image of a positive print, it will be understood that the invention described herein is also applicable to such positive processes as that described in U.S. Pat. No. 3,414,410. In this process, a photosensitive material is uniformly dye sensitized and then exposed to an image pattern of activating radiation to desensitize the dye-sensitized medium to activating radiation in those portions thereof which are struck by radiation during the initial exposure, and then subsequently this thus partially-desensitized medium is exposed to activating radiation to activate those as yet unexposed areas of said medium ---
[1] Periodic Table from Lange's Handbook of Chemistry, 9th edition, pp. 56–57, 1956.

which correspond with opaque areas of the original image. By contacting with image-forming material, as described in the prior art, a positive visible image of the original positive is produced.

Image-forming materials which are useful in this invention are those such as described in U.S. Pat. 3,152,903 and in copending application Ser. No. 199,211 now abandoned. These image-forming materials include preferably an oxidizing agent and a reducing agent. Such image-forming materials are often referred to in the art as physical developers. The oxidizing agent is generally the image-forming component of the image-forming material. However, this is not necessarily true. Either organic or inorganic oxidizing agents may be employed as the oxidizing component of the image-forming material. Preferred oxidizing agents comprise the reducible metal ions having at least the oxidizing power of cupric ion and include such metal ions as $Ag^+$, $Hg^{+2}$, $Pb^{+4}$, $Au^{+3}$, $Pt^{+4}$, $Ni^{+2}$, $Sn^{+2}$, $Pb^{+2}$, $Cu^{+1}$, and $Cu^{+2}$. Other suitable oxidizing agents useful in this invention as components of an image-forming material are permanganate ($MnO_4^-$) ion, various leuco dye materials such as disclosed in co-pending application Ser. No. 623,534, filed in the name of L. Case, and the like. Organic oxidizing agents include tetrazolium salts, such as tetrazolium blue and red, and diphenyl carbazone, and genarcyl red 6B (methine dye).

The reducing agent components of the image-forming materials of this invention include organic compounds such as the oxalates, formates, substituted and unsubstituted hydroxylamine, and substituted and unsubstituted hydrazine, ascorbic acid, aminophenols, and the dihydric phenols. Also, polyvinylpyrrolidone, alkali and alkaline earth metal oxalates and formates are useful as reducing agents. Suitable reducing compounds include hydroquinone or derivatives thereof, o- and p-aminophenol, p-methylaminophenol sulfate, p-hydroxyphenyl glycine, o- and p-phenylene diamine, and 1-phenyl-3-pyrazolidone.

Additionally, the image-forming materials or physical developers may contain organic acids which can react with metal ions to form complex metal anions. Further, the developers may contain other complexing agents and the like to improve image formation and other properties found to be desirable in this art.

Additional stabilizing and fixing steps such as known to the art may also be added to the processes of this invention in order to increase life and permanence of the final print.

The following examples are given to illustrate this invention.

EXAMPLE 1

A mixture of 4 parts by weight of titanium dioxide and 1 part by weight of an emulsion of "Rhoplex" acrylate resin containing about 50 percent of solids in water is used to coat paper sheets.

A sheet of the coated paper is sensitized by dipping into a solution containing 20 milligrams of 2-p-dimethylaminostyryl-4-methylthiazole metho chloride in 200 ml. of methanol, and then dried.

The sensitized paper is exposed to imaging light from a Kodak 101 sensitometer which has a tungsten lamp producing an intensity of 1700 meter candles at the sensitometric wedge and a color temperature of 2650° K. for twenty seconds.

The exposed prints are then dipped in a saturated solution of silver nitrate in methanol, and then in a solution comprising 5 gm. of phenidone, 40 gm. of citric acid monohydrate, and 1 liter of methanol. A visible negative image of the positive exposure image was obtained. The visible image bearing print is then immersed in a methanolic potassium thiocyanate (KSCN) stop bath, then fixed by immersing in an aqueous sodium thiosulfate solution, and finally washed in running water. The photographic speed was determined by the LES method. LES (abbreviation for light exposure speed) refers to a speed rating system developed at the Wright Air Development Division of the Air Research and Development Command (U.S.A.F.), and is defined as the reciprocal of the exposure in meter candle seconds which is required to produce a double diffuse reflection density of 0.2 density units above the sum of the base plus fog densities. As in the more conventional ASA system used to rate silver halide films, the higher the LES number the faster the photographic exposure speed of the film is.

Exposures are made on an Eastman 101 sensitometer with the light converted by the use of a 78AA Eastman Wratten Filter to equal mean noonday light (5500° K.). In addition, the step tablet in the sensitometer is partly covered with strips of Eastman filters No. 58 (green transmitting) and No. 29 (red transmitting) so that a single exposure gives a measure of the response of the film to white, green and red light. The resulting LES through the 78AA filter is $1.98 \times 10^{-2}$ with a gamma of 0.89 and a $D_{max}$ of 1.33. Through the 78AA+58 filters, LES is $1.24 \times 10^{-2}$ with a gamma of 0.91 and a $D_{max}$ of 1.29. The background fog is 0.16.

Alternatively, filled paper sheets containing about 20 percent of photoconductive ZnO and $TiO_2$ pigment are prepared in conventional paper making apparatus by addition of an aqueous slurry of the pigment to the beater and utilized in the above described procedure.

Finely-divided water-insoluble photoconductive pigments are also dye sensitized by contacting the pigments with dilute solutions of sensitizing dyes. Excess dye solution is decanted, and the treated pigments are dried. The pigments can suitably be deposited without a binder on a substrate such as glass, or can be incorporated into a plastic or the fibrous web of a paper, or can be dispersed in a binder such as polyvinyl alcohol and used to coat rigid or flexible electrically insulating or conducting substrates.

EXAMPLE 2

A photosensitive copy medium composed of a cellulose triacetate support coated with a finely-divided titanium dioxide dispersed in gelatin is sensitized by dipping into a solution containing an aqueous solution of 2-p-dimethylaminostyryl - 4 - methyl-thiazole metho chloride such as described in Example 1. The thus-treated triacetate film is then imaged and tested as in Example 1. Thus thus-treated film gives an LES of $6.42 \times 10^{-3}$ with a $D_{max}$ of 3.0 through the 78AA filter and an LES of $4.0 \times 10^{-3}$ through the 78AA+58 filter. A control print prepared as described above except that no dye was on the print gives an LES of $3.15 \times 10^{-3}$ and a $D_{max}$ of 1.7 through the 78AA filter. A spectrogram of the dyed print shows strong sensitization extending into the visible as far as 630 m$\mu$.

A cellulose triacetate support coated with a finely-divided titanium dioxide dispersed in gelatin is dip dyed with a mixture of 2-p-dimethylaminostyryl-4-methyl-thiazole metho chloride and 1′,3-diethylthia-4′-carbocyanine-chloride and processed according to the above procedure wherein the film is exposed for twenty seconds on the sensitometer gives an LES of $4.14 \times 10^{-3}$ through the 78AA filter; $3.65 \times 10^{-3}$ through the 78AA+58 filters; and $1.85 \times 10^{-2}$ through the 78AA+29 filters. The spectrogram of this film shows strong sensitization from 400 through 750 m$\mu$.

EXAMPLE 3

A finely-divided titanium dioxide having an average particle size of less than about 250 millimicrons and having been heated in an oxidizing atmosphere at a temperature between about 200° C. to about 950° C. for from about 0.5 hour to about 30 hours is added to a water bath to form a slurry. Gelatin is dissolved in a second water bath and the gelatin solution is added to the titanium dioxide slurry. Then an aqueous solution of 2-p-dimethylaminostyryl - 4 - methyl-thiazole metho chloride is added to this gelatin-titanium dioxide slurry. A strip of cellulose triacetate is then coated with this slurry by means of a wire wound rod. The thus-coated triacetate strip is then dried, dark-adapted, and then exposed to an image pattern of activating radiation as in Example 1 and then developed. The photographic speed as indicated by the LES is much improved as compared to a control cellulose acetate strip which has been similarly coated except for having no dye and then tested in an identical manner as described above.

EXAMPLES 4-21

Titanium dioxide coated paper substrates similar to that described in Example 1 are dip dyed with the dyes listed in Table 1. The coating and testing procedure are the same as those of Example 1. The results of these tests are reported in Table II.

If mixtures of dyes are used whose absorption curves overlap a mutual anti-sensitization is usually observed so that the resulting speed is considerably less than additive. However, if dyes are selected having widely-separated absorption maximum additive response is possible and even in some cases one dye may supersensitize the other. 2-(p - dimethylaminostyryl)-benzimidazole metho chloride of 2-[4-(p - dimethylamino-phenyl)-1,3-butadienyl]-1,3,3-trimethylpseudo-indolium chloride (R=CH$_3$) are an example of the latter effect. The table shows that 2-[4-(p-dimethylamino - phenyl)-1,3-butadienyl]1,3,3-trimethylpseudo-indolium chloride (R=CH$_3$) gives 50% greater red and green-light speed when 2-(p-dimethylaminostyryl)-benzimidazole metho chloride is present, although 2-(p-dimethylaminostyryl)-benzimidazole metho chloride has no sensitizing action itself in this part of the spectrum.

The response of the 4-[3-(3-ethyl-2(3H)-benzothiazolylidene)propenyl]-quinoline, a carbocyanine dye base, is another example of super-sensitization. In this case the dye base acts as a super-sensitizer for its own acidified form which is present on the weakly acid binder system used with the titanium dioxide coated paper. 4-[3-(3-ethyl-2(3H)-benzothiazolylidene)propenyl]-quinoline has its maximum absorption at 476 m$\mu$, yet it sensitizes in the same range as 1',3'-diethyl thia-4'-carbocyanine iodide which is the quaternary dye related to it whose absorption maximum is at 626 m$\mu$. If a drop of acid is added to a methanol solution of 4-[3-(3-ethyl-2(3H)-benzothiazolylidene)propenyl]-quinoline the absorption maximum shifts to 613 m$\mu$. The blue color obtained when the RS paper is dipped in a solution of 4-[3-(3-ethyl-2(3H)-benzothiazolylidene)propenyl]-quinoline is indicative of conversion to the hydro-salt. However, 1',3'-diethyl thia-4'-carbocyanine iodide has only half the white-light speed of 4-[3-ethyl-2(3H)-benzothiazolylidene)propenyl]-quinoline and we explain this increase in speed for the dye base as compared with the dye as a supersensitization of the hydro-salt on the TiO$_2$ coated paper by traces of the base which remains in equilibrium with it.

4 - (3-ethyl-2(3H)-benzothiazolylidene)methyl quinoline, another dye base and the lower vinylene homolog of 4-[3-(3-ethyl-2-(3H) - benzothiazolylidene)propenyl]-quinoline is a further example of this behavior on titanium dioxide coated paper. In this case the pure hydrosalt related to 4-(3-ethyl-2(3H)-benzothiazolylidene) methyl quinoline (4-(3-ethyl-2(3H)-benzothiazolylidene methyl)-quinoline hydro-p-toluene sulfonate) was prepared and tested and also the quaternary analog, the cyanine dye 1',3'-diethyl thia-4'-cyanine iodide. All three were found to sensitize in the same spectral range but 4 - (3-ethyl-2(3H)-benzothiazolylidene)methyl quinoline gave five times the speed of 1',3-diethyl thia-4'-cyanine iodide and three times the speed of its pure hydro-salt.

TABLE I

| Dye No. | Styryl dyes and vinylene homologs |
|---|---|
| 4 | 2-p-dimethylaminostyryl-4-methylthiazole metho chloride |

| 5 | 2-[4-(p-dimethylamino-phenyl)-1,3-butadienyl]-1,3,3-trimethylpseudo-indolium chloride |

| 6 | 2-(p-dimethylaminostyryl)-benzimidazole metho chloride |

| 7 | 2-(p-dimethylaminostyryl)-6-ethoxy-quinoline metho chloride |

| 8 | 6-dimethylamino-2-(p-dimethylamino-styryl)-quinoline metho chloride |

TABLE I—Continued

| Dye No. | Styryl dyes and vinylene homologs |
|---|---|
| 9 | 2-p-dimethylaminophenyl-6-methylbenzothiazole metho chloride (Thioflavine T) 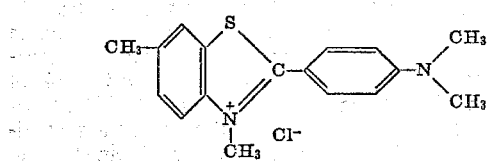 |
| 10 | 3,3-dimethyl-2[6(p-dimethyl amino phenyl)1,3,5-hexatrienyl] indolenine ethiodide 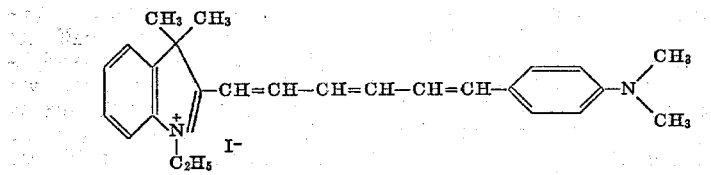 |
| 11 | 2(p-dimethylaminostyryl)-3,5-dimethyl-thiadiazolium nitrate 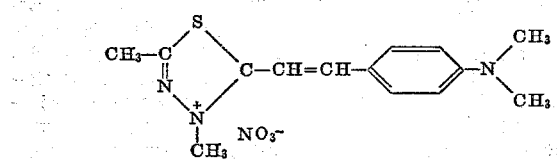 |
| 12 | 2-p-dimethylaminostyryl-4-methylthiazole-β-hydroxy etho-chloride 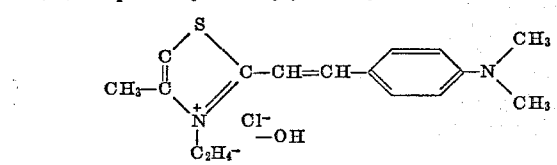 |
| 13 | 2-p-dimethylaminostyryl-5-methyl-1,3,4-thiadiazole-β-hydroxy-etho chloride 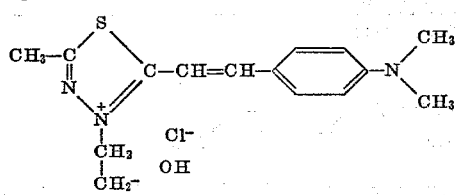 |

| | Cyanine dye bases and their hydro salts |
|---|---|
| 14 | 4-[3-(3-ethyl-2(3H)-benzothiazolylidene)propenyl] quinoline 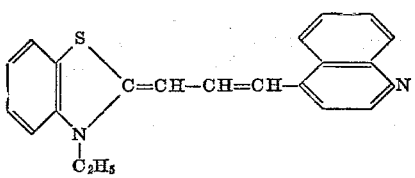 |
| 15 | 4-(3-ethyl-2(3H)-benzothiazolylidene)methyl quinoline 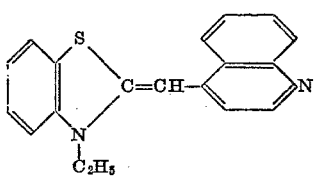 |

| | Cyanine dyes having an alkylene bridge between the two nitrogen atoms |
|---|---|
| 16 | 3,3'-ethylenethiacyanine chloride 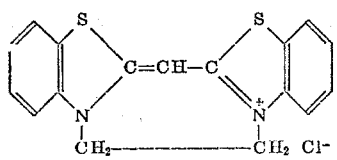 |

Miscellaneous dyes tested for comparison

TABLE I—Continued

Dye No. Styryl dyes and vinylene homologs 17. 1,1'-diethyl-4 4'-carbocyanine iodide (cryptocyanine)

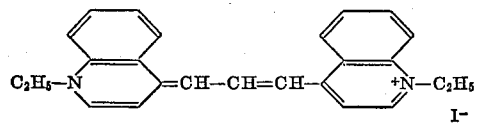

18. 3-ethyl-5-[3-ethyl-2(3H)-benzoxazolylidene)ethylidene] rhodanine

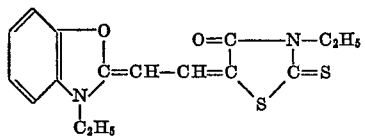

19. 3-ethyl-5-[(3-ethyl-2(3H)-benzothiazolylidene)ethylidene] rhodanine

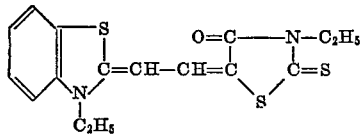

20. P,P',P'' hexamethyl triaminotriphenyl methylinium chloride (crystal violet)

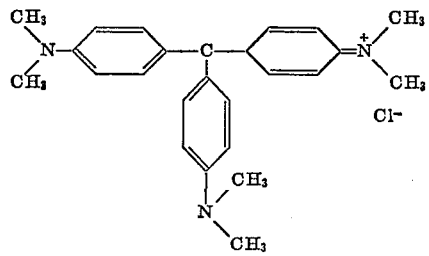

TABLE II.—DYE TESTS ON RS PAPER

| Example No. | Dye No. | Abs. max in MeOH, mμ | Sensitization range, mμ | 78 AA Filter | | 78AA +58 | | 78AA +29 | |
|---|---|---|---|---|---|---|---|---|---|
| | | | | LES×10⁻² | Dmax | LES×10⁻² | Dmax | LES×10⁻² | Dmax |
| 4 | 4 | 475 | 430–600 | 1.37 | 1.35 | 1.15 | 1.30 | | |
| 5 | 5 | 600 | 480–750 | 1.4 | 1.5 | 0.6 | 1.2 | 4.6 | 1.4 |
| 6 | 6 | 425 | 400–550 | 1.2 | 1.5 | 0.2 | 0.4 | | |
| 6a | 5 & 6 | | 400–750 | 1.65 | 1.5 | 1.1 | 1.2 | 6.3 | 1.3 |
| 7 | 7 | 511 | 430–670 | 1.73 | 1.4 | 1.36 | 1.3 | 0.63 | 0.56 |
| 8 | 8 | 528 | 420–670 | 2.28 | 1.42 | 1.92 | 1.32 | 1.25 | 0.84 |
| 9 | 9 | 415 | 400–510 | 0.927 | 1.36 | | | | |
| 10 | 10 | 630 | 530–700 | 0.43 | 1.38 | 0.92 | 1.30 | 4.55 | 1.3 |
| 11 | 11 | 493 | 440–630 | 1.89 | 1.3 | 1.33 | 1.3 | | |
| 12 | 12 | 476 | 410–600 | 3.29 | 1.30 | 2.30 | 1.24 | | |
| 13 | 13 | 496 | 404–600 | 2.61 | 1.32 | 1.87 | 1.24 | | |
| 14 | 14 | 610 | 490–670 | 1.0 | 1.3 | 0.6 | 0.8 | 2.75 | 0.7 |
| 15 | 15 | 429 | 420–570 | 1.62 | 1.4 | 0.58 | 0.9 | | |
| 16 | 16 | 439 | 404–470 | 2.03 | 1.35 | | | | |
| 17 | 17 | 700 | 600–700+ | 0.19 | 0.39 | Weak | 0.27 | 1.95 | 0.32 |
| 18 | 18 | 489 | (¹) | 0.058 | | Weak | | Weak | |
| 19 | 19 | 522 | (¹) | 0.051 | | Weak | | Weak | |
| 20 | 20 | 590 | 530–630 Weak | 0.075 | | Weak | | Weak | |
| 21 | (²) | | 360–410 | 0.097 | 1.30 | | | | |

¹ Too weak to measure.  ² Control (no dye).

The photographic reproduction system containing the dyes of Examples 4–16 possessed markedly improved photographic exposure speeds, as indicated by the LES, as compared to those control systems of Examples 17–21 utilizing no sensitizing dye or other miscellaneous dyes.

We claim:

1. In an image reproduction medium comprising (1) a photoconductor comprising a radiation activatable photosensitive titanium dioxide and (2) a sensitizing dye, the improvement wherein the sensitizing dye comprises a cyanine dye selected from at least one of the group consisting of:

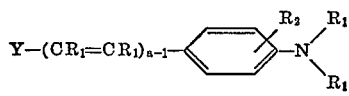

and

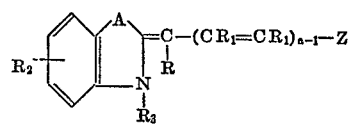

and wherein Y is selected from any of the group consisting of:

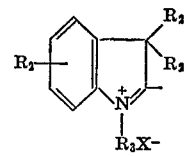

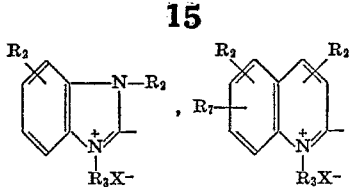

and

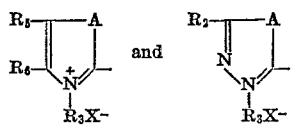

and Z is selected from any of the group consisting of:

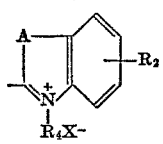

and

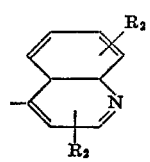

R may be an —H or a —C≡N group; $R_1$ may be hydrogen, alkyl, aralkyl, aryl, and alkaryl groups and wherein any $R_1$ on a given molecule may be the same or different as any other $R_1$ on this molecule; $R_2$ may be hydrogen, alkyl, aralkyl, aryl, alkaryl, alkoxy, and $$-\underset{R_1}{\overset{R_1}{N}}-$$

wherein $R_1$ is as above described and wherein any $R_2$ on a given molecule may be the same or different as any other $R_2$ on this molecule; $R_3$ and $R_4$ may be hydrogen, an alkyl, aralkyl, or an alkanol group and may be the same or different, or $R_3$ and $R_4$ may form part of the same alkylene, aralkylene, alkalkylene, or hydroxy substituted alkylene group; $R_5$ and $R_6$ may be hydrogen, alkyl, aralkyl, aryl or alkaryl groups and wherein $R_5$ or $R_6$ may be the same or different than any other $R_5$ or $R_6$ group on the same molecule and wherein $R_5$ or $R_6$ may form part of the same ring structure when on adjacent carbon atoms and as such same ring structure may form cycloalkylene or aryl groups, or subsituted cycloalkylene or aryl groups; $R_7$ is a —$OR_1$

group and at least one $R_7$ group must be present; X is a monovalent anion; A is a sulphur (S) or a selenium (Se) group; and $a$ is a positive integer selected from the group consisting of 1, 2, 3, 4, and 5.

2. An image reproduction medium as in claim 1 comprising additionally an image-forming material selected from at least one member of the group consisting of: (1) the oxidizing agent component of color-forming oxidation-reduction reaction composition, and (2) the reducing agent component of said color-forming oxidation-reduction reaction composition.

3. An image reproduction medium as in claim 1 wherein X is a halide.

4. An image reproduction medium as in claim 1 wherein the photosensitive material is dispersed in a hydrophilic binder.

5. An image reproduction medium as in claim 1 wherein the titanium dioxide is in the form of finely divided-particles dispersed in a resinous binder.

6. An image reproduction medium as in claim 1 additionally comprising a metallic image of a metal selected from the group consisting of silver, mercury, lead, gold, platinum, nickel, tin and copper.

7. In an image reproduction medium comprising a radiation-activatable, photosensitive photoconductor material comprising titanium dioxide having an average particle size of less than about 250 millimicrons the improvement comprising adding to said system a cyanine dye-sensitizing composition comprising a cyanine dye selected from at least one of the group consisting of:

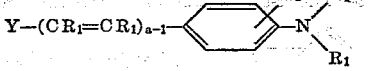

and

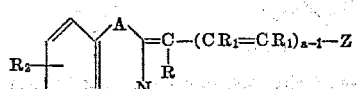

wherein Y is selected from any of the group consisting of:

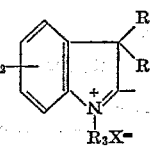

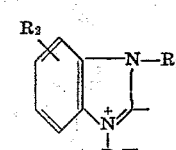

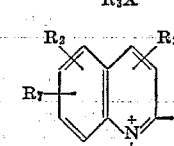

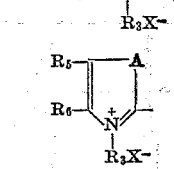

and

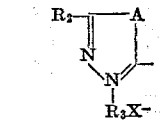

and Z is selected from any of the group consisting of:

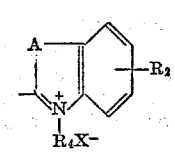

and

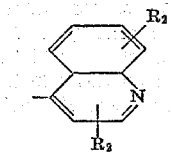

R may be a —H or a —C≡N group; $R_1$ may be hydrogen, alkyl, aralkyl, aryl, and alkaryl groups and wherein any $R_1$ on a given molecule may be the same or different as any other $R_1$ on this molecule; $R_2$ may be hydrogen, alkyl, aralkyl, aryl, alkaryl, alkoxy, and

wherein $R_1$ is as above described and wherein any $R_2$ on a given molecule may be the same or different as any other $R_2$ on this molecule; $R_3$ and $R_4$ may be hydrogen, an alkyl, aralkyl, or an alkanol group and may be the same or different, or $R_3$ and $R_4$ may form part of the same alkylene, aralkylene, alkalkylene, or hydroxy substituted alkylene group; $R_5$ and $R_6$ may be hydrogen, alkyl, aralkyl, aryl or alkaryl groups and wherein $R_5$ or $R_6$ may be the same or different than any other $R_5$ or $R_6$ group on the samel molecule and wherein $R_5$ or $R_6$ may form part of the same ring structure when on adjacent carbon atoms and as such same ring structure may form cycloalkylene or aryl groups, or substituted cycloalkylene or aryl groups; $R_7$ is an $—OR_1$ or

group and at least one $R_7$ group must be present; X is a monovalent acid radical; A is a sulphur (S) or a selenium (Se) group; and $a$ is a positive integer selected from the group consisting of 1, 2, 3, 4 and 5.

8. An image reproduction medium as in claim 7 which comprises additionally an image-forming material selected from at least one member of the group consisting of: (1) the oxidizing agent component of color-forming oxidation-reduction reaction composition, and (2) the reducing agent component of a color-forming oxidation-reduction reaction composition.

9. An image reproduction medium as in claim 7 wherein said photosensitive material is dispersed in a hydrophilic binder.

10. An image reproduction medium as in claim 7 wherein said photosensitive material was heated at a temperature between about 200° C. and 950° C.

11. An image reproduction medium as in claim 8 wherein said photosensitive material was heated at a temperature between about 200° C. and about 950° C.

12. An image reproduction medium as in claim 7 wherein said photosensitive material was produced by a high temperature pyrolysis of titanium halide and wherein X is a halide.

13. An image reproduction medium as in claim 8 wherein said titanium dioxide was produced by a high temperature pyrolysis of titanium halide.

14. An image reproduction medium as in claim 7 wherein said photosensitive material is incorporated in a polyvinyl alcohol binder and coated on a paper substrate.

15. An image reproduction medium as in claim 7 wherein said photosensitive material is incorporated in a gelatin binder and coated on a substrate transparent to visible light.

16. An image reproduction medium as in claim 8 wherein said photosensitive material is coated on a substrate transmissive of visible light.

17. An image reproduction medium as in claim 7 wherein said cyanine dye sensitizing composition selected from at least one of the group of
2-p-dimethylaminostyryl-4-methylthiazole methochloride;
2-[4-(p-dimethylamino-phenyl)-1,3-butadienyl]-1,3,3-trimethylpseudoindolium chloride;
2-(p-dimethylaminostyryl)benzimidazole metho chloride;
2-(p-dimethylaminostyryl)-6-ethoxy-quinoline metho chloride;
6-dimethylamino-2-(p-dimethylamino-styryl)quinoline metho chloride;
2-p-dimethylaminophenyl-6-methylbenzothiazole metho chloride (Thioflavine T);
3,3-dimethyl-2[6(p-dimethyl amino phenyl) 1,3,5-hexatrienyl]indolenine ethiodide;
2 (p-dimethylaminostyryl)-3,5-dimethyl-thiadiazolium nitrate;
2-p-dimethylaminostyryl-4-methylthiazole-β-hydroxy-etho-chloride;
2-p-dimethylaminostyryl-5-methyl-1,3,4-thiadiazole-β-hydroxy-etho-chloride;
4-[3-(3-ethyl-2(3H)-benzothiazolylidene)propenyl] quinoline;
4-(3-ethyl-2(3H)-benzothiazolylidene)methyl quinoline; and
3,3'-ethylenethiacyanine chloride.

18. In a process for recording an image pattern of activating radiation in the absence of an externally-applied electric field, comprising exposing a copy medium comprising a photoconductor comprising photosensitive titanium dioxide to an image pattern of activating radiation and contacting with a physical developer comprising a solution of metal ions, the improvement comprising incorporating in said copy medium at the time of or prior to the exposing step, a cyanine dye sensitizing composition comprising a cyanine dye selected from at least one of the group consisting of:

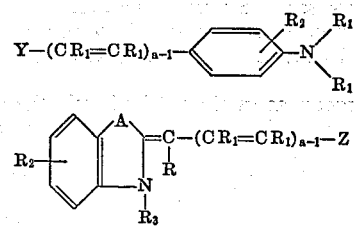

and wherein Y is selected from any of the group consisting of:

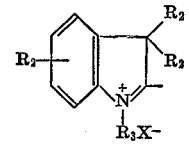

and

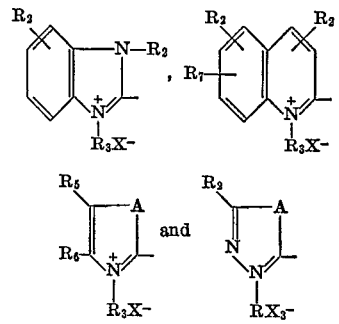

and Z is selected from any of the group consisting of:

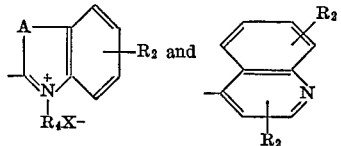

R may be an $—H$ or a $—C{=}N$ group; $R_1$ may be hydrogen, alkyl, aralkyl, aryl, and alkaryl groups and wherein any $R_1$ on a given molecule may be the same or different as any other $R_1$ on this molecule; $R_2$ may be hydrogen, alkyl, aralkyl, aryl, alkaryl, alkoxy, and

wherein $R_1$ is as above described and wherein any $R_2$ on a given molecule may be the same or different as any other $R_2$ on this molecule; $R_3$ and $R_4$ may be hydrogen, an alkyl, aralkyl, or an alkanol group and may be the same or different, or $R_3$ and $R_4$ may form part of the same alkylene, aralkylene, alkalkylene, or hydroxy substituted alkylene group; $R_5$ and $R_6$ may be hydrogen, alkyl, aralkyl, aryl or alkaryl groups and wherein $R_5$ or $R_6$ may be the same or different than any other $R_5$ or $R_6$ group on the same molecule and wherein $R_5$ or $R_6$ may form part of the same ring structure when on adjacent carbon atoms and as such same ring structure may form cycloalkylene or aryl groups, or substituted cycloalkylene or aryl groups; $R_7$ is an $-OR_1$ or

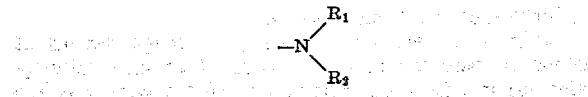

group and at least one $R_7$ group must be present; X is a monovalent acid radical; A is a sulphur (S) or a selenium (Se) group; and $a$ is a positive integer selected from the group consisting of 1, 2, 3, 4 and 5.

19. A process as in claim 18 wherein the titanium dioxide has an average particle size less than about 250 millimicrons.

20. A process as in claim 19 wherein the titanium dioxide is dispersed in a hydrophilic binder.

21. The process as in claim 19 wherein the binder is polyvinyl alcohol and said binder is coated on a paper substrate.

22. A process as in claim 19 wherein the cyanine dye sensitizing composition is selected from at least one of the group of 2-p-dimethylaminostyryl-4-methylthiazole methochloride;
2-[4-(p-dimethylamino-phenyl)-1,3-butadienyl]-1,3,3-trimethylpseudoindolium chloride;
2-(p-dimethylaminostyryl)-benzimidazole methochloride;
2-(p-dimethylaminostyryl)-6-ethoxy-quinoline methochloride;
6-dimethylamino-2-(p-dimethylamino-styryl)-quinoline methochloride;
2-p-dimethylaminophenyl-6-methylbenzothiazole methochloride (Thioflavine T);
3,3-dimethyl-2[6(p-dimethylamino-phenyl) 1,3,5-hexatrienyl]indolenine ethiodide;
2(p-dimethylaminostyryl)-3,5-dimethylthiadiazolium nitrate;
2-p-dimethylaminostyryl-4-methylthiazole-β-hydroxy-etho-chloride;
2-p-dimethylaminostyryl-5-methyl-1,3,4-thiadiazole-β-hydroxy-etho-chloride;
4-[3-(3-ethyl-2(3H)-benzothiazolylidene)propenyl] quinoline;
4-(3-ethyl-2(3H)-benzothiazolylidene) methyl quinoline; and
3,3'-ethylenethiacyanine chloride.

23. A process as in claim 18 wherein the copy medium comprises additionally an image forming material selected from at least one member of the group consisting of: (1) the oxidizing agent component of color-forming oxidation-reduction reaction composition, and (2) the reducing agent component of said color-forming oxidation-reduction reaction composition.

24. A process as in claim 18 wherein said image forming material comprise silver ions and the reducing agent component of a color-forming silver ion containing oxidation-reduction reaction composition.

References Cited
UNITED STATES PATENTS

| | | | |
|---|---|---|---|
| 3,099,558 | 7/1963 | Levinos | 96—36.3 X |
| 3,152,903 | 10/1964 | Shepard et al. | 96—64 |
| 3,380,823 | 4/1968 | Gold | 96—27 |
| 3,429,706 | 2/1969 | Shepard et al. | 96—27 |
| 3,121,006 | 2/1964 | Middleton et al. | 96—1 |
| 3,125,447 | 3/1964 | Stewart | 96—1.7 |
| 3,128,179 | 4/1964 | Kendall et al. | 96—1.7 |

NORMAN G. TORCHIN, Primary Examiner

R. FICHTER, Assistant Examiner

U.S. Cl. X.R.

96—1.6, 1.7, 48 PD; 96—88; 252—501